United States Patent
Yamada et al.

(10) Patent No.: US 8,705,386 B2
(45) Date of Patent: Apr. 22, 2014

(54) WIRELESS COMMUNICATION APPARATUS AND WIRELESS COMMUNICATION METHOD

(75) Inventors: Tsutomu Yamada, Hitchinaka (JP); Yoshinori Okura, Mito (JP); Yoshihito Sato, Hitachi (JP); May Takada, Koganei (JP)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 12/820,233

(22) Filed: Jun. 22, 2010

(65) Prior Publication Data

US 2010/0329137 A1   Dec. 30, 2010

(30) Foreign Application Priority Data

Jun. 25, 2009  (JP) ................ 2009-150442

(51) Int. Cl.
*H04L 12/26* (2006.01)
*H04J 3/16* (2006.01)

(52) U.S. Cl.
USPC .......................... 370/252; 370/468

(58) Field of Classification Search
None
See application file for complete search history.

(56) References Cited

U.S. PATENT DOCUMENTS

| | | | | |
|---|---|---|---|---|
| 5,933,425 | A * | 8/1999 | Iwata | 370/351 |
| 6,069,895 | A * | 5/2000 | Ayandeh | 370/399 |
| 6,542,490 | B1 * | 4/2003 | Ahmadvand et al. | 370/338 |
| 6,594,268 | B1 * | 7/2003 | Aukia et al. | 370/400 |
| 6,597,684 | B1 * | 7/2003 | Gulati et al. | 370/351 |
| 6,963,578 | B2 * | 11/2005 | Akahane et al. | 370/417 |
| 7,085,291 | B2 * | 8/2006 | Zhang et al. | 370/473 |
| 7,295,514 | B2 * | 11/2007 | Cha et al. | 370/230 |
| 7,573,860 | B2 * | 8/2009 | Zhao et al. | 370/342 |
| 7,616,658 | B2 * | 11/2009 | Harada et al. | 370/465 |
| 7,756,137 | B2 * | 7/2010 | Okura et al. | 370/395.21 |
| 7,907,559 | B2 * | 3/2011 | Fodor et al. | 370/328 |
| 7,995,464 | B1 * | 8/2011 | Croak et al. | 370/218 |
| 8,009,573 | B2 * | 8/2011 | Duan | 370/252 |
| 8,107,457 | B2 * | 1/2012 | White et al. | 370/350 |
| 8,259,751 | B2 * | 9/2012 | Shi et al. | 370/468 |
| 8,315,166 | B2 * | 11/2012 | Wang | 370/230 |
| 8,355,413 | B2 * | 1/2013 | Vasamsetti et al. | 370/468 |
| 8,406,219 | B2 * | 3/2013 | Ahn | 370/351 |
| 8,472,416 | B2 * | 6/2013 | Kowalski | 370/338 |
| 8,483,123 | B2 * | 7/2013 | Zheng et al. | 370/328 |
| 2003/0074443 | A1 | 4/2003 | Melaku et al. | |
| 2003/0169760 | A1 | 9/2003 | Sato et al. | |

(Continued)

FOREIGN PATENT DOCUMENTS

| | | |
|---|---|---|
| DE | 10 2005 030 796 | 1/2007 |
| JP | 2003-258717 | 9/2003 |

(Continued)

*Primary Examiner* — Gregory Sefcheck
(74) *Attorney, Agent, or Firm* — Antonelli, Terry, Stout & Kraus, LLP.

(57) ABSTRACT

A plurality of wireless communication methods are combined, networks to be used are dynamically selected by evaluating each network quality, and a packet format is changed adaptively to realize necessary reliability. The wireless communication apparatus has a network interface, a data interface, a quality interface, an allocation control part, a quality database, a quality update part, communication units and antennas. The wireless communication apparatus receives data and a requested quality from an application apparatus, selects the communication unit and communication method suitable for the requested quality, and transmits the data and requested quality. The communication unit receives a communication quality of the communication partner, and the quality update part updates the communication quality state in the quality database.

18 Claims, 11 Drawing Sheets

(56) References Cited

U.S. PATENT DOCUMENTS

| | | |
|---|---|---|
| 2004/0085922 A1 | 5/2004 | Herle |
| 2005/0002375 A1* | 1/2005 | Gokhale et al. ............... 370/347 |
| 2005/0281199 A1* | 12/2005 | Simpson et al. ............. 370/238 |
| 2007/0218934 A1 | 9/2007 | Osaki |
| 2008/0101290 A1* | 5/2008 | Sung et al. ................... 370/331 |
| 2009/0064250 A1 | 3/2009 | Nakata |
| 2010/0002692 A1* | 1/2010 | Bims ............................ 370/389 |
| 2010/0046531 A1* | 2/2010 | Louati et al. ................. 370/401 |
| 2010/0098007 A1* | 4/2010 | Kim et al. .................... 370/329 |
| 2010/0214991 A1 | 8/2010 | Luers |
| 2010/0217837 A1* | 8/2010 | Ansari et al. .................. 709/218 |
| 2010/0265903 A1* | 10/2010 | Maheshwari ................ 370/329 |

FOREIGN PATENT DOCUMENTS

| | | |
|---|---|---|
| JP | 2005-318327 | 11/2005 |
| JP | 2007-208853 | 8/2007 |
| JP | 2008-011258 | 1/2008 |
| JP | 2009-130904 | 6/2009 |

* cited by examiner

FIG.5

| | REQUESTED LOWER LIMIT BER | REQUESTED UPPER LIMIT BER | ALIAS | COMMUNICATION UNIT NUMBER | COMMUNICATION SPEED [bps] | TRANSMISSION POWER | PROPAGATION LOSS | REDUNDANCY METHOD |
|---|---|---|---|---|---|---|---|---|
| 90 | — | $1.0 \times 10^{-5}$ | NONE | 1 | 54M | 20dBm | 80dB | N/A |
| 91 | $1.0 \times 10^{-5}$ | $1.0 \times 10^{-6}$ | LOW | 1 | 36M | 15dBm | 80dB | HEADER DUPLICATION |
| 92 | $1.0 \times 10^{-6}$ | $1.0 \times 10^{-7}$ | MEDIUM | 1 | 24M | 16dBm | 80dB | HEADER DUPLICATION |
| 93 | $1.0 \times 10^{-6}$ | $1.0 \times 10^{-7}$ | MEDIUM | 2 | 24M | 13dBm | 77dB | HEADER DUPLICATION |
| 94 | $1.0 \times 10^{-7}$ | — | HIGH | 1 | 12M | 16dBm | 80dB | HEADER TRIPLICATION, SIZE RESTRICTION |
| 95 | $1.0 \times 10^{-7}$ | — | HIGH | 2 | 12M | 13dBm | 77dB | HEADER TRIPLICATION, SIZE RESTRICTION |
| 96 | $1.0 \times 10^{-7}$ | — | HIGH | 3 | 12M | 11dBm | 75dB | HEADER TRIPLICATION, SIZE RESTRICTION |
| 97 | — | — | DIAG | 1 | X | Y | — | SEQ UNIQUE |
| 98 | — | — | DIAG | 2 | X | Y | — | SEQ UNIQUE |
| 99 | — | — | DIAG | 3 | X | Y | — | SEQ UNIQUE |

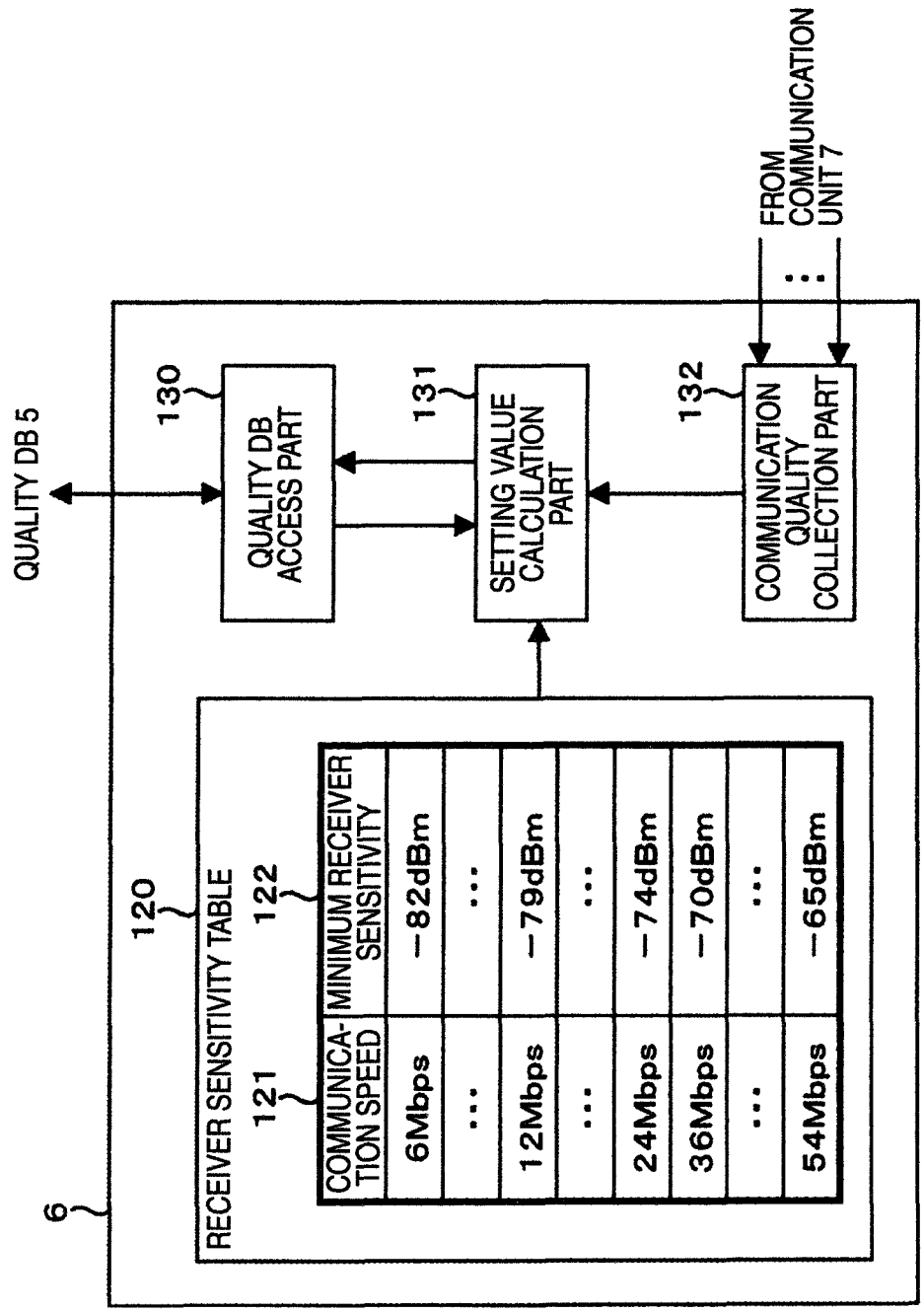

WIRELESS COMMUNICATION APPARATUS AND WIRELESS COMMUNICATION METHOD

BACKGROUND OF THE INVENTION

The present invention relates to a wireless communication apparatus and a wireless communication method, and more particularly to a communication apparatus and a communication method suitable for securing reliability necessary for communication data.

Techniques are known for communicating with a communication partner by using a plurality of wireless communication techniques.

In an example of the techniques of this kind, a communication state to a partner wireless communication apparatus is judged from a reception signal, and in accordance with this judgment, some of a plurality of transmission/reception functions are allocated for communications with the partner at the same time.

Techniques of improving a communication quality by improving an operation rate of a plurality of transmission/reception function units and increasing a communication capacity are disclosed, for example, in JP-A-2003-258717. More specifically, channels suitable for communications are selected in accordance with information (receiver signal strength and transmission acknowledge) on a communication state, and input data is sent to some of a plurality of modulation/demodulation parts. Data output from a plurality of modulation/demodulation parts are sent to some wireless frequency converter parts, and data output from some wireless frequency converter parts are sent to some antennas to transmit the transmission data at a plurality of wireless frequencies at the same time depending upon the communication state.

SUMMARY OF THE INVENTION

Data to be subjected to wireless communication has generally different reliability to be requested by an application using the data. For example, high reliability is requested for data for controlling an input/output apparatus, whereas relatively low reliability is sufficient for data for monitoring the input/output apparatus. A loss of monitor image data may be permitted in some cases by positively using techniques of compensating the loss from image data before and after the lost image.

Conventionally, in accordance with communication state information such as a receiver signal strength and a transmission acknowledge, a wireless communication apparatus changes a radio wave frequency of transmission data and a modulation/demodulation method. A communication state is judged based upon reliability corresponding to an application using the wireless communication apparatus.

With the above-described conventional techniques, however, since the wireless communication apparatus changes the radio wave frequency and modulation/demodulation method in accordance with information on a transmission acknowledge and the like, a communication quality of transmission data is unable to be managed based upon an application.

Further, when considering the circumstance that the number of applications using wireless communications is increasing, if a wireless terminal is prepared for each of a plurality of applications, it is not desirous from the viewpoint of wireless frequency resources and the viewpoint of apparatus installation cost.

Various types of wireless communication modules such as packet communication modules in a mobile phone network and wireless LAN modules are usable nowadays. Thus, it is effective to use these wireless communication modules in order to prepare wireless apparatuses quickly. It is considered that a unified interface to these wireless communication modules becomes necessary to allow applications requiring different reliability to use a plurality of wireless communication modules.

Considering the above-described background, it is therefore an object of the present invention to provide a wireless communication apparatus and a wireless communication method capable of managing a communication quality corresponding to transmission data or an application. The present invention regarding a more specific configuration provides a wireless communication apparatus and a wireless communication method capable of solving at least some of the above-described problems.

In order to achieve the above-object, the present invention is configured in such a manner that data containing communication data is acquired, a requested communication quality is determined from the acquired data, and the communication data is wirelessly communicated so as to realize the determined communication quality.

The wireless communication apparatus includes preferably: a network interface for data input/output relative to a first network or a second network; a data interface for receiving data from the network interface; a quality interface for receiving a wireless communication requested quality of the data from the network interface; a quality database for storing a communication method corresponding to the requested quality; a plurality of wireless communication units; and an allocation control part for distributing the data to some of the plurality of wireless communication units, wherein the allocation control part searches a communication unit designation corresponding to the requested quality from the quality database, and determines some of the plurality of wireless communication units in accordance with a search result.

The allocation control part searches a transmission power instruction corresponding to the requested quality from the quality database, and in accordance with a search result, sets a transmission port to the plurality of wireless transmission units.

The allocation control part searches a communication speed instruction corresponding to the requested quality from the quality database, and in accordance with a search result, sets a communication speed to the plurality of wireless transmission units.

The allocation control part searches a redundancy method instruction corresponding to the requested quality from the quality database, and in accordance with a search result, makes redundant a portion of the data and transmits the data to the plurality of wireless communication units.

The wireless communication apparatus further includes a quality database update part which in accordance with information on a transmission power and a reception power from the plurality of wireless communication units, calculates a propagation loss and updates the quality database by the propagation loss.

The quality database update part further includes a transmission output calculating part and a receiver sensitivity table, wherein the transmission output part updates the transmission output instruction in the quality database in accordance with the propagation loss and the receiver sensitivity table.

The wireless communication unit has a USB card or a PC card which is connected to the wireless communication apparatus via a bridge.

The wireless communication apparatus has a radio wave quality managing part which notifies a diagnosis request to another wireless communication apparatus, and receives a diagnosis response corresponding to the diagnosis request to update the receiver sensitivity table.

A communication quality may be represented by a bit error rate (BER), a packet error rate (PER), a communication delay time or the like. By realizing wireless communications corresponding to each communication quality, it becomes possible to adopt wireless communications to an application requesting high usability and high real time performance such as a monitor control application.

It is also possible to dynamically change a communication method in accordance with a communication quality requested by an application.

According to the present invention, it becomes possible to satisfy a requested communication quality and perform wireless communications with high reliability, in accordance with the characteristics of communication data or an application apparatus.

In a more specific configuration, it becomes possible to instruct a requested quality at high abstraction independently from a mount method of the wireless communication unit. It is therefore possible to configure a wireless communication apparatus by mounting a combination of a plurality of wireless communication units. Since the communication methods are flexibly combined in a various way, a wireless communication method is able to be realized which does not adversely affect a communication method even if another communication method has interference.

It is also possible to obtain a minimum receiver sensitivity suitable for communication settings, by following a change in the wireless communication environment. It is therefore possible set a proper wireless transmission output and perform communications of high reliability and stability in each of a plurality of wireless communication methods.

A communication quality requested by application data is able to be notified via a unified interface by using a plurality of wireless communication units so that communications are possible at the notified communication quality.

The other objects and methods of achieving the objects will be readily understood in conjunction with the description of embodiments of the present invention and the drawings.

BRIEF DESCRIPTION OF THE DRAWINGS

FIG. 5 illustrates the configuration of a quality database according to the first embodiment of the present invention.

FIG. 6 illustrates an example the configuration of a quality update part according to the first embodiment of the present invention.

DESCRIPTION OF THE EMBODIMENTS

The present invention pertains to a wireless communication apparatus using a plurality of wireless communication units. Description will first be made on a communication system using wireless communication apparatuses of the present invention. Next, description will be made on the configuration of the wireless communication apparatus and a wireless communication method of the present invention. Although each function is described as a term "unit" in some cases, it means that each function is able to be realized by generally known specific techniques (e.g., software and hardware). Terms "section" and "part" are used in a similar way.

First Embodiment

Figure 1:
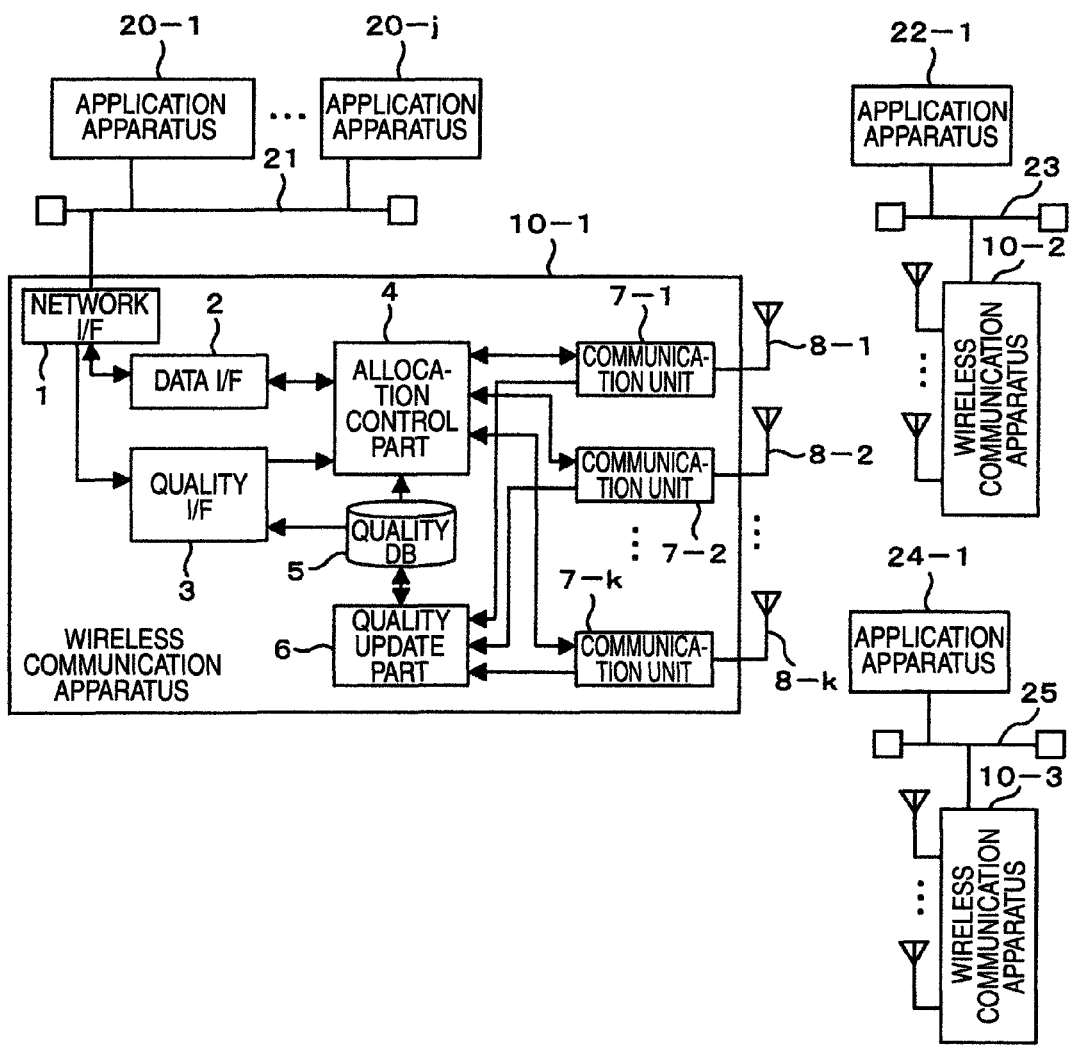
FIG. 1 illustrates the outline of a communication system adopting wireless communication apparatuses according to a first embodiment of the present invention.

FIG. 1 illustrates the outline of a communication system adopting wireless communication apparatuses according to the first embodiment of the present invention.

With reference to FIG. 1, description will be made on the configuration of the communication system. The communication system has application apparatuses 20, 22 and 24, wireless communication apparatuses 10 and networks 21, 23 and 25.

Application apparatuses 20-1, . . . , 20-$j$ ("j" is an integral number) is connected to a wireless communication apparatus 10-1 via the network 21. Other application apparatuses 22 (22-1, . . . ) and 24 (24-1, . . . ) and wireless communication apparatuses 10-2 and 10-3 are connected in a similar way.

Various apparatuses including a general computer such as a PC, a controller apparatus, a monitor terminal and the like may be adopted as the application apparatuses 20, 22 and 24. Each application apparatus has a function of transmitting/receiving "data" and corresponding "requested quality", corresponding to the data, to/from the networks 21, 23 and 25 and the like.

The networks 21, 23 and 25 connect the application apparatuses 20 and wireless communication apparatuses 10. The present invention is not restricted by the type of a network. As a network of the present invention, it is possible to adopt a wired network such as Ethernet (registered trademark) in conformity with the IEEE802.3 specifications, IEEE1394, USB (registered trademark) and EIA-232/422/485, a wireless network such as a wireless LAN in conformity with the IEEE802.11 specifications, a sensor network in conformity with the IEEE802.15.4 and a specified low-power radio wireless network. In the following description, a configuration adopting Ethernet is used by way of example.

The communication system of the present invention is applicable also to the case in which a plurality of application apparatuses and wireless communication apparatuses exist. In this embodiment, it is assumed that "j" application apparatuses 20 per one wireless communication apparatus and three wireless communication apparatuses exist, and each constituent element is represented by a reference numeral with a suffix. In the following, although an application apparatus and a wireless communication apparatus will be described without a suffix unless otherwise specifically noted, the function and operation of other application apparatuses and wireless communication apparatuses are similar to the first-described function and operation.

In the present application, although description will be made on the configuration of three wireless communication apparatuses, the advantages of the present invention are not degraded even if a plurality of wireless communication apparatuses: two or more apparatuses, are used. The wireless communication apparatus 10 has a network interface (I/F) 1, a data I/F 2, a quality I/F 3, an allocation control part 4, a quality database (DB) 5, a quality update part 6, communication units 7-1 to 7-$k$ and antennas 8-1 to 8-$k$. The suffix "$k$" means the number of communication units 7 and the number of antennas 8 of the wireless communication apparatus 10 of this application.

In the present invention, the type of the communication unit 7 is not limited, and it is neither required to be the same type. For example, among wireless communication units including, for example, a wireless LAN in conformity with the IEEE802.11 specification, a sensor network in conformity with the IEEE802.15.4 specifications, a specified low-power radio wireless network, and a mobile phone packet network, a combination of a plurality of wireless communication units may be used. In order to ensure communication stability, it is preferable to use different communication methods and frequencies and diversify radio wave units. One of the characteristics of the present invention reside in that the wireless communication apparatus 10 receives data and requested quality from the application apparatus 20, and selects a communication unit and method in accordance with the requested quality to send data. One of the characteristics reside also in that the communication unit receives a communication quality of a communication partner and the quality update part 6 updates the quality DB 5 regarding the communication quality state.

Next, description will be made on the relation of functions of the wireless communication apparatus 10 by using data transmission/reception between the application apparatuses 20-1 and 22-1 by way of example.

For example, the application apparatus 20 is assumed to be an apparatus for sending data from a sensor and the (another) application apparatus 22 is assumed to be an apparatus for receiving data from a sensor and a monitor human machine interface (HMI) and drawing the data on a screen.

The wireless communication apparatus 10-1 receives data and requested quality from the application apparatus 20-1 at the network I/F 1 via the network 21.

In the present invention, a bit error rate (BER) is used as the requested quality by way of example in the following description. Other examples of the requested quality may be an arrival delay time to a communication partner, a packet error rate (PER) and the like. Although the details will be described later, in the present invention, it is possible to perform data communications matching various communication qualities.

For example, as the monitor HMI, there exists an application capable of permitting a loss of data from the sensor. The requested quality of sensor data to be transmitted may be BER=10e−4 ("10eX" means 10 to the Xth power). Data of an abnormal notice is an example unable to permit the loss of data. The requested quality of data of the abnormal notice may therefore be BER=10e−7.

It is advantageous in that even for communications using the same wireless communication apparatus, the application apparatus is allowed to set the communication quality (e.g., BER) requested for each set of data.

The communication I/F 1 asks the allocation control part 4 for processing the received data via the data I/F 2 and the received requested quality via the quality I/F 3. The allocation control part 4 refers to the quality DB 5 and extracts the communication unit 7 and communication method corresponding to the requested communication quality (BER) and the process contents of communication packet conversion, division and the like. Thereafter, the allocation control part 4 execute the process by using the extracted results, and sends a communication packet to the communication unit 7. The communication unit 7 transmits a radio wave packet to the wireless communication apparatus 10-2 via the antenna 8.

The wireless communication apparatus 10-2 sends data received at the communication units 7 via a plurality of antennas 8, and asks the allocation control part 4 for processing the data. The allocation control part 4 generates data to be sent to the application apparatus 22 through data merger and conversion, and sends the data to the data I/F 2. The data I/F 2 converts the received data into a communication packet suitable for the network I/F 1, and transmits the data to the network 23 via the communication I/F 1. The transmitted data is received at the application apparatus 22-1 to complete the communication processes.

The quality update part 6 updates the quality DB 5 in accordance with the wireless network state. The quality update part 6 collects a reception signal strength, transmission response presence/absence, error correction statistical information and the like, from a data reception status at the communication unit 7. A propagation loss of each communication partner is calculated from the collection results and registered in the quality DB 5. The details of the quality DB 5 will be described later. In order to acquire settable requested qualities, the application apparatus 20 is able to request the wireless communication apparatus 10 for a requested quality list. After the requested quality list is acquired, the application apparatus 20 is able to set the requested quality to the standard data and instruct the quality to the wireless communication apparatus 10.

In the manner described above, the application apparatus 20 is able to instruct the wireless communication apparatus 10 to send data, in accordance with the requested quality of the application to be executed. It is therefore possible to perform wireless communications from a plurality of application apparatuses 20 requesting different communication qualities via a single wireless communication apparatus 10.

Figure 2:
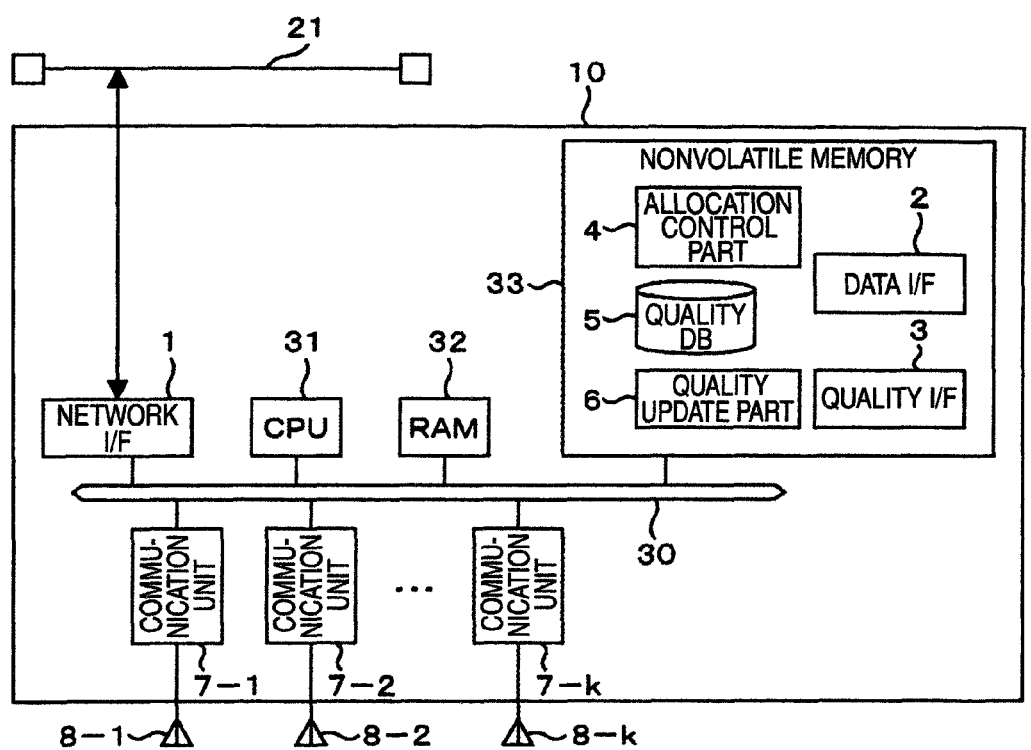
FIG. 2 illustrates an example of the configuration of the wireless communication apparatus according to the first embodiment of the present invention.

FIG. 2 illustrates an example of the configuration of the wireless communication apparatus of the first embodiment.

With reference to FIG. 2, description will be made on the configuration of the wireless communication apparatus 10. The wireless communication apparatus 10 has components including an internal bus 30, a CPU 31, a RAM 32, and a nonvolatile memory 33, and the network I/F 1, communication units 7-1 to 7-$k$ and antennas 8-1 to 8-$k$, and the like.

These components are interconnected by the internal bus 30 and exchange data with each other. The internal bus 30 is a bus provided with the performance and operation necessary for interconnecting these components, and may be an asynchronous memory bus, a peripheral component interconnect (PCI) bus, a PCI express bus or the like.

CPU 31 reads instructions and constants of programs for realizing the allocation control part 4, quality DB 5, quality update part 6, data I/F 2, quality I/F 3 and the like loaded in the nonvolatile memory 33, stores these instructions and constants in RAM 32 when necessary, and reads and writes the instructions and constants to perform a software process. The nonvolatile memory 33 may be an electronically erasable and programmable ROM (EEPROM), a flash memory, or a magneto-optical medium such as a hard disc drive and a CD-ROM.

The communication unit 7 itself may be a discrete module to be connected to the internal bus 30. The communication unit 7 may be connected directly to the internal bus 30, or may be connected via a bridge component (not shown) which interconnects the communication unit 7 and internal bus 30 when necessary.

If the communication unit 7 has an USB interface and the internal bus 30 is a PCI bus, it is preferable to realize connection via a PCI-USB bridge LSI (not shown). If the communication unit 7 has a PC card interface and the internal bus is a PCI bus, similarly it is preferable to realize connection via a PCI-PC card bridge LSI (not shown). In both cases, it is possible that the application apparatus designates reliability at high abstraction and performs wireless communication independent from implementing of the communication unit 7.

The network I/F 1 informs CPU 31 of communication data received from the network 21, and also transmits data requested from CPU 31 via the internal bus 30 to the network 21. Consider now that the network 21 uses Ethernet. It is preferable to adopt a LAN control LSI having an interface with the internal bus, as the network I/F 1.

The network I/F 1 informs CPU 31 of a status change or occurrence of a process request, by using an interrupt signal (not shown). The CPU 31 executes the above-described software and an interrupt process from the network I/F 1, to realize a target function.

Figure 3:
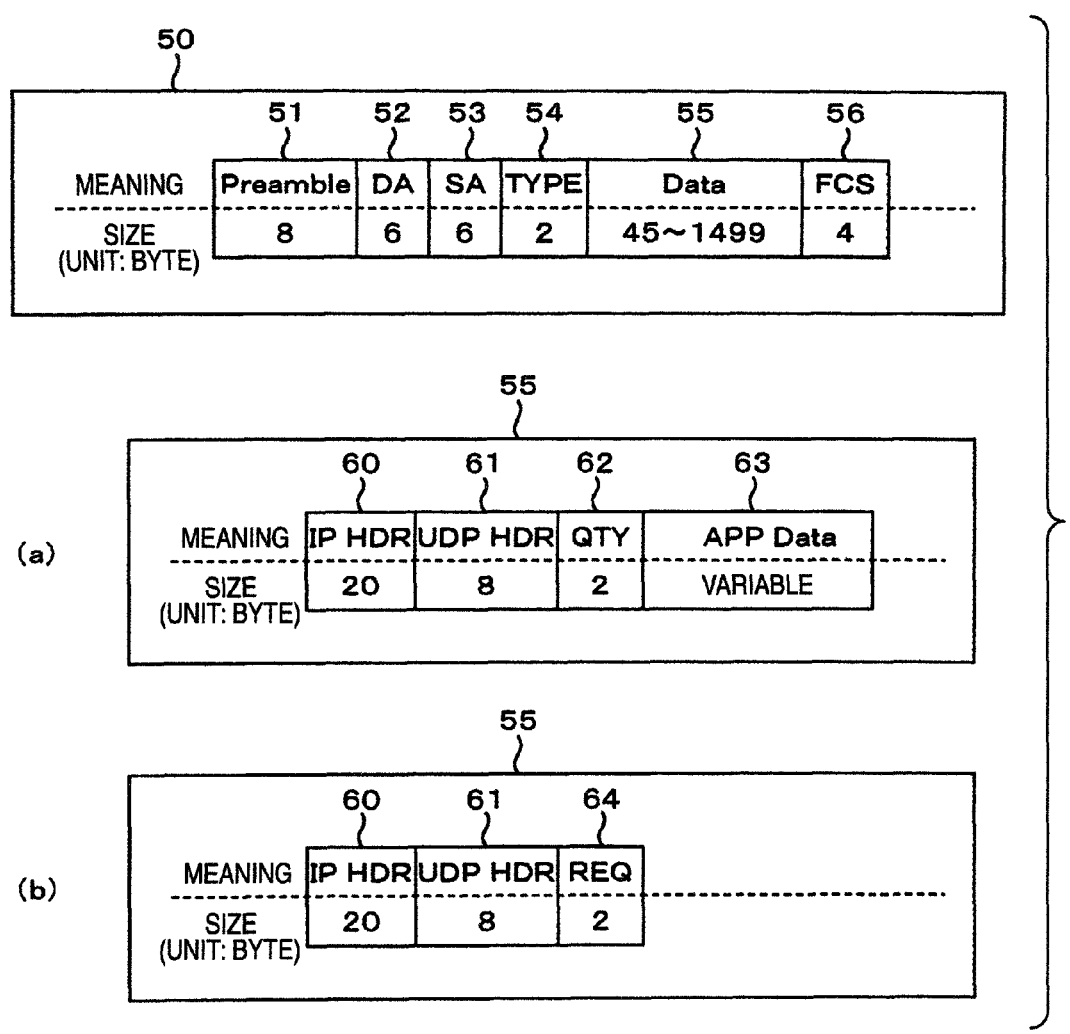
FIG. 3 illustrates the configuration of a communication packet to be transferred between the wireless communication apparatus and an application apparatus according to the first embodiment of the present invention.

FIG. 3 illustrates the configuration of a communication packet to be transferred between the wireless communication apparatus and application apparatus.

In this embodiment, a communication packet 50 uses a packet format of Ethernet. The left side of the drawing is a top of the packet, and the communication packet has, from the left side, a preamble 51, a destination address (DA) 52, a source address (SA) 53, a type 54, data 55 and inspection data (frame check sequence (FCS)). An example of the size of each constituent element is added to FIG. 3.

If the communication packet is a communication packet to be sent from the application apparatus 20 to the wireless communication apparatus 10, DA 52 is a MAC address of the network I/F 1 of the wireless communication apparatus 10, and SA 53 is a MAC address of the application apparatus 20. The type 54 indicates a type of the communication packet, and in this embodiment, IP (0x0800) is used where 0x is a prefix indicating a hexadecimal number. The data 55 includes data from the application apparatus 20 and a communication quality requested for the data. The inspection data 56 is data for detecting error generated during transmission of the communication packet 50, and adopts CRC of 32 bits in the case of Ethernet.

The contents of the data 55 will be described in detail. The configuration of the data 55 is illustrated in (a) and (b) of FIG. 3. In (a) of FIG. 3, the data 55 has an IP header 60, a UDP header 61, a requested quality 62 and application data 63. In (b) of FIG. 3, the data 55 has an IP header 60, a UDP header 61 and a quality list request 64.

In this embodiment, a port number (not shown) of the UDP header 61 designates the type of the communication packet. Namely, when the application apparatus 20 transmits application data and a requested quality, a number representative of "standard data" is loaded in the port number of the UDP header 61, and the communication packet is transmitted in the packet configuration of (a) of FIG. 3. When the application apparatus 20 transmits a quality list request, a number representative of "quality list request" is loaded in the port number of the UDP header 61, and the communication packet is transmitted in the packet configuration of (b) of FIG. 3.

In (a) of FIG. 3, the application apparatus 20 sets a requested value corresponding to the application data 63 of the communication packet, to the requested quality 62. Code capable of being identified by both the application apparatus 20 and wireless communication apparatus 10 is loaded in the requested quality 62. For example, a value corresponding to a requested BER may be loaded in the requested quality 62 in a single precision floating point type. Alternatively, an "alias" of the requested quality to be described later may be loaded. One of the characteristics of the present invention is that the requested quality 62 is able to be set to each set of application data 63.

In adopting the present invention while general IP communications are performed between a plurality of application apparatuses 20 and the wireless communication apparatus 10, it is effective for the IP header 60 and UDP header 61 to identify the communication packet. It is possible for the IP header 60 and UDP header 61 to use definitions in conformity with the standard UDP/IP protocol. In the present invention, it is not essential to use the IP header 60 and UDP header 61. For example, if general IP communications are not performed between the application apparatus 20 and wireless communication apparatus 10, address allocation by an IP address is unnecessary. In this case, a unique Ethernet frame type may be set to the type 54 if both the application apparatus 20 and wireless communication apparatus 10 are able to recognize the unique Ethernet frame type, and the IP header 60 and UDP header are unnecessary in this setting.

If Ethernet is not used for the network 21, the present invention is able to be realized by using a communication packet storing information corresponding to the IP header and UDP header.

Figure 4:
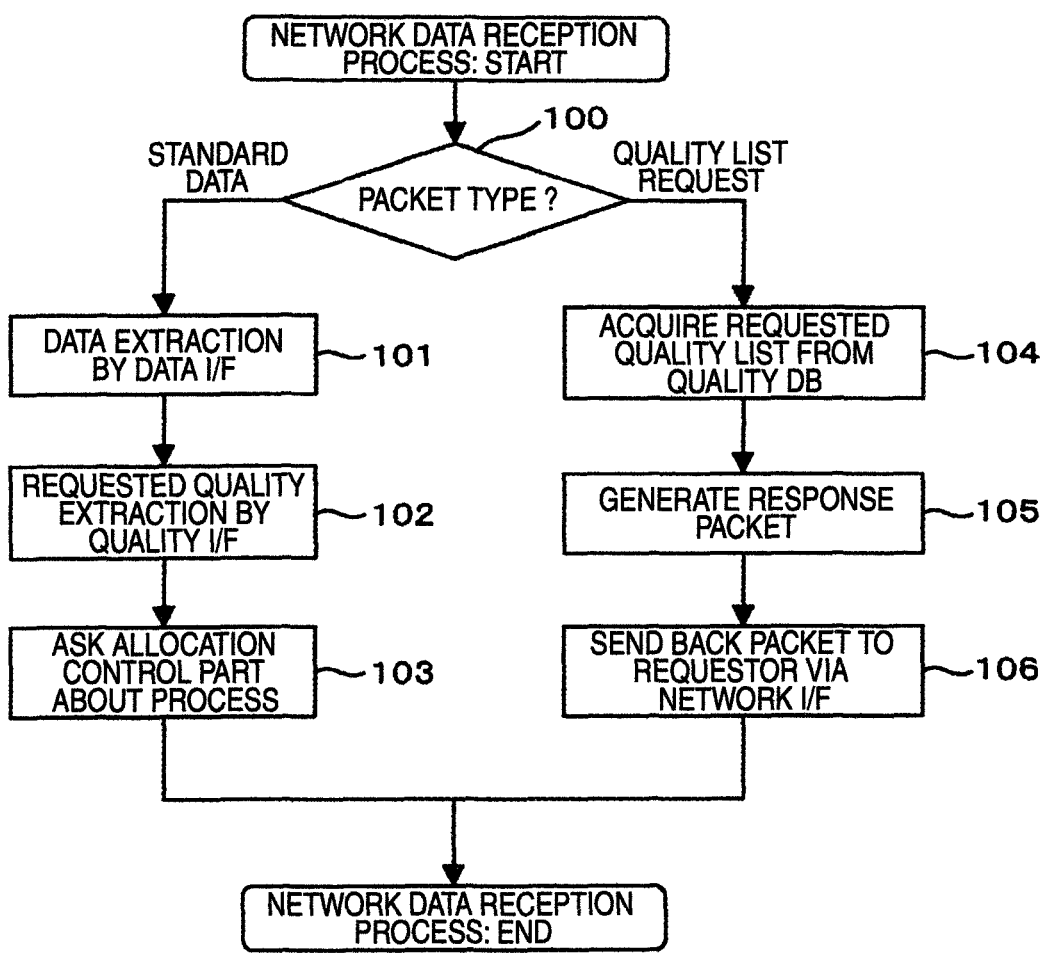
FIG. 4 is a flow chart illustrating a network data reception process according to the first embodiment of the present invention.

FIG. 4 is a flow chart illustrating a network reception data process of the first embodiment of the present invention.

With reference to FIG. 4, description will be made on a flow of processing data received from the network 21 via the network I/F 1.

Upon reception of data from the network I/F 1, CPU 31 judges the type of the received packet from the UDP header 61 (Step 100).

If the packet type is standard data, the data I/F 2 extracts the application data 63 (Step 101). The quality I/F 3 extracts the requested quality 62 (Step 102). Thereafter, the allocation control part 4 is asked for a data transmission process matching the requested quality (Step 103) to thereafter terminate the network reception data process.

If the packet type is a quality list request, the quality I/F 3 acquires a list of settable requested qualities from the quality DB 5 (Step 104). Thereafter, the quality I/F 3 generates a response packet loading the acquired list (Step 105). The quality I/F 3 sends back the response packet to the requestor via the network I/F 1 (Step 106) to thereafter terminate the process.

FIG. 5 illustrates the configuration of the quality database of the first embodiment of the present invention.

The quality DB 5 is a database indicating correspondence between which communication unit is selected and how setting and redundancy are performed, in order to achieve the requested quality (BER).

With the quality DB 5, it becomes possible for the application apparatus 20 to set a requested quality for each of transmission data without considering the implementing of the communication unit.

The quality DB 5 has attributes including a requested lower limit BER 80, a requested upper limit BER 81, an alias 82, a communication unit number 83, a communication speed 84, a transmission power 85, a propagation loss 86 and a redundancy method 87.

FIG. 5 illustrates an example of tuples 90 to 99 stored in the quality DB 5.

In the example of FIG. 5, the alias 82 is given for the requested lower limit BER 80 and requested upper limit BER 81. The alias is a name arranged to make it easy to set BER of data to be requested by the application apparatus 20. By expressing the alias 82 by an integer index, it becomes possible to load the alias 82 in the requested quality 62 in (a) of FIG. 3

The communication unit number 83 is a number for designating one of a plurality of communication units 7. For example, if "1" is designated, the communication unit 7-1 is designated. Settings (communication speed 84 and transmission power 85) corresponding to the communication unit 7 designated by the communication unit number 83 are stored in tuples.

The propagation loss 86 is a propagation loss of a power from a "power amplifier output terminal (not shown)" of the communication unit 7 on the transmission side to a "power amplifier input terminal (not shown)" of the communication unit 7 on the reception side. The propagation loss is constituted of a transmission side feeder line loss, a transmission side antenna gain, a radio wave propagation loss, a reception side antenna gain and a reception side feeder line loss. More particularly, the propagation loss includes also a shielding loss, a loss by interference of another radio wave, and the like. In this embodiment, the propagation loss is obtained in an easy manner as will be described later, and loaded in the propagation loss 86.

The redundancy method 87 is performed by the allocation control part 4 when data is passed to the communication unit. For example, the redundancy method 87 of the tuple 90 stores a value "N/A" (Not Applicable) not performing redundancy. The redundancy method 87 of the tuple 91 stores a value "header duplication". The redundancy method 87 of the tuple 94 stores a value "header triplication, size restriction".

The "header" is a top field of a wireless communication packet, and means a medium access control (MAC) header for storing a destination, a source and the like of the packet. As a header is made multiplication, even if there is an error in the data field including the header field, it is possible to identify the source from the other header and send a re-transmission request smoothly. The source is therefore possible to transmit again without waiting for a response notice timeout, thereby improving real time performance of communications.

The "size restriction" in the redundancy method 87 restricts the packet size to be small. In the characteristics of wireless communications, as the packet size becomes large, a reception success possibility of the whole packet becomes low. If the packet is not received normally, a re-transmission process occurs. However, time disturbance until reception completion by the re-transmission process is not desired by an application taking important consideration of real time performance. Restricting the packet size to be small aims to lower a re-transmission possibility and shorten a re-transmission time when re-transmission is performed.

If the alias 82 is "MEDIUM" or "HIGH", a plurality of registrations are in the communication number 83. This means that packets are transmitted to a plurality of communication units in parallel. By transmitting the packets to a plurality of communication units, it is possible to realize a predetermined BER.

The quality DB 5 of this embodiment is set in advance by a designer. Namely, each setting value and the redundancy method are designed in advance so as to satisfy each requested BER to prepare the quality DB 5. The propagation loss 86 and transmission power 85 are updated by the quality update part 6. The details for updating processes will be described later.

The tuples 97 to 99 having the alias 82 of "DIAL" are used in another embodiment, and the details thereof will be described later.

FIG. 6 illustrates an example of the configuration of the quality update part of the first embodiment of the present invention.

The quality update part 6 has a receiver sensitivity table 120, a quality DB access part 130, a setting value calculation part 131 and a communication quality collection part 132.

The receiver sensitivity table 120 has attributes of a communication speed 121 and a minimum receiver sensitivity 122. In this embodiment, the minimum receiver sensitivity corresponds to a packet error rate of 10% for a packet of 1000 bytes. For example, in order to realize a communication speed of 6 Mbps, the minimum receiver sensitivity of −82 dBm is ensured.

The quality DB access part 130 has a function of referring to the contents of the quality DB 5, and in response to a request from the setting value calculation part 131, updating the contents of the quality DB 5.

The communication quality collection part 132 acquires the values of reception signal intensities and transmission powers from a plurality of communication units 7.

The setting value calculation unit 131 has a function of calculating values to be set to the quality DB 5, by using information obtained from the quality DB 5, receiver sensitivity table 120 and communication quality collection part 132.

Description will be made on the operation of the setting value calculation part 131. A transmission power and a receiver signal strength regarding the communication unit 7 are received from the communication quality collection part 132 to obtain a propagation loss under the current environment. By using the obtained propagation loss, the propagation loss 86 of the communication unit 7 is updated in the quality DB 5. Next, a transmission power is obtained by the following formula for the communication speed 84 of the quality DB 5.

$$\text{Transmission power} \geq \text{Minimum receiver sensitivity} + \text{Margin} + \text{Propagation loss}$$

The margin is properly set in accordance with requested reliability. The margin of the embodiment is 0 dBm if the requested quality is NONE, 5 dBm if the requested quality is LOW, 10 dBm if the requested quality is MEDIUM, and 15 dBm if the requested quality is HIGH. These values may be properly determined by considering the environment and application to be used.

For example, more than 15 dBm is calculated for the tuple 91 having the requested quality of LOW since a transmission power at a communication speed of 36 Mbps is −70 dBm+5 dBm+80 dBm=15 dBm.

By using the above-described method, the setting value calculation part 131 sequentially calculates a transmission power of each tuple in accordance with the propagation loss in the environment where the wireless communication apparatus 10 is mounted. The setting value calculation unit 131 sets the result of the calculated transmission power to the quality DB 5 via the quality DB access part 130.

Figure 7:
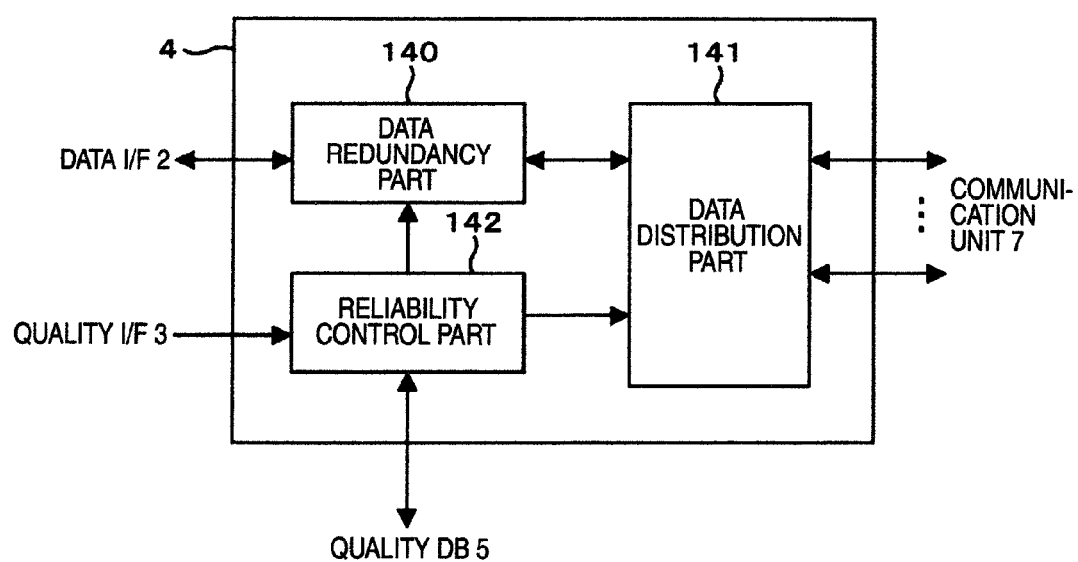
FIG. 7 illustrates an example of the configuration of an allocation control part according to the first embodiment of the present invention.

FIG. 7 illustrates an example of the configuration of the allocation control part of the first embodiment of the present invention.

The allocation control part 4 has a data redundancy part 140, a reliability control part 142 and a data distribution part 141.

In the allocation control part 4, data is input from the data I/F 2 to the data redundancy part 140, and a requested quality corresponding to the data is input from the quality I/F 3 to the reliability control part 142.

In accordance with an instruction from the reliability control part 142, the data distribution part 141 sets a communication speed and a transmission output to the communication unit 7, and distributes data supplied from the data redundancy part 140.

Figure 8:
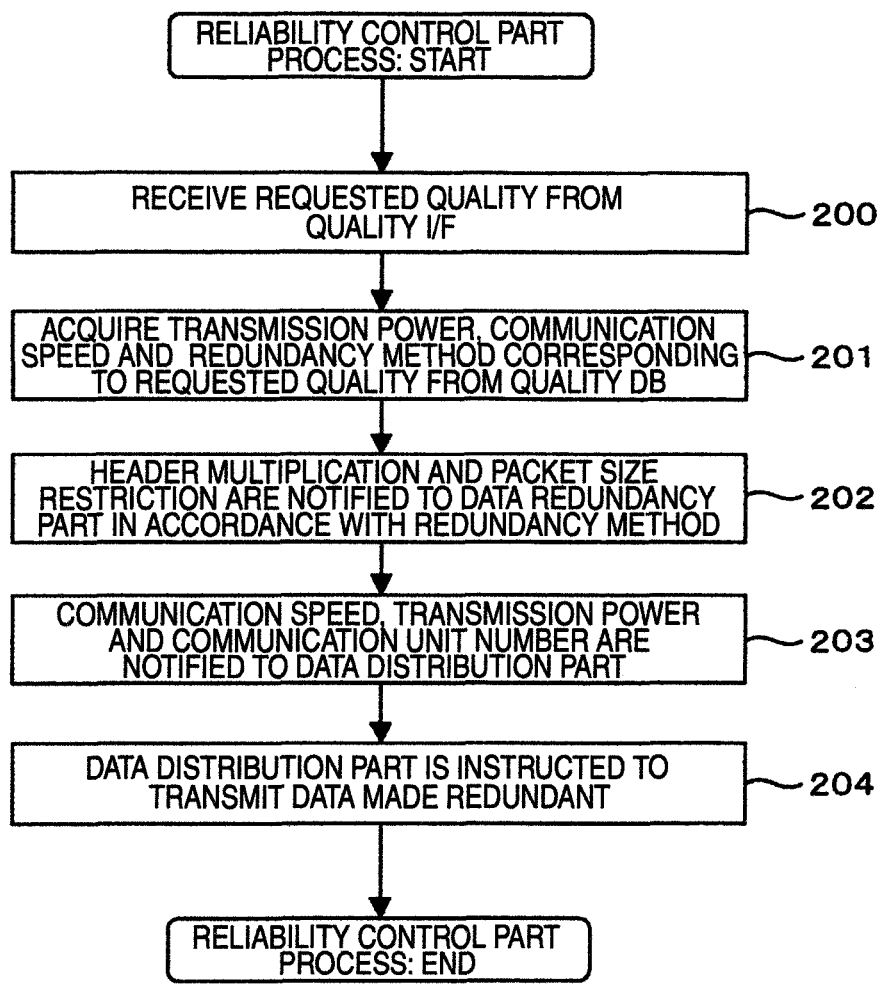
FIG. 8 is a flow chart illustrating the operation of a reliability control part according to the first embodiment of the present invention.

By using the flow chart of FIG. 8, description will be made on a process to be executed by the reliability control unit 142.

First, a requested quality is received from the quality I/F 3 for the requested quality (Step 200). Next, the quality DB 5 is inquired by using as a key the requested quality input from the quality I/F 3 to obtain information on a transmission power, a communication speed and a redundancy method for the requested quality (Step 201). In accordance with information on header multiplication and size restriction in the information on the redundancy method, the reliability control part 142 instructs the data redundancy part 140 (Step 202). The reliability control part 142 notifies the data distribution part 141 of a communication speed, a transmission power and a communication unit number (Step 203). The reliability control part 142 selects the communication unit 7 for transmitting data made redundant, in accordance with the acquired communication unit number, and instructs the data distribution part 141 to transmit the data made redundant (Step 204).

Description will be made on the operation of a partner wireless communication apparatus which received a transmitted wireless communication packet.

The communication unit 7 of the wireless communication apparatus 10-2 on the reception side notifies the received packet to the data distribution part 141 of the allocation control part 4. The data distribution part 141 judges whether the packet is a packet made redundant. Used as the judgment criterion are redundancy information notified by the header and a sequence number uniquely assigned to each packet.

Redundant packets received in parallel from a plurality of communication units 7 are unified in accordance with the design guidance. For example, a first arriving packet is preferentially used if important consideration is taken for real time performance.

Next, the data redundancy part 140 decodes the in-packet redundancy (such as header multiplication). The data redundancy part 140 obtains therefore the original data transmitted from the application apparatus 20.

The original data is converted into a communication packet capable of being transmitted to the network 23, by the data I/F 2. The communication packet is transmitted to the application apparatus 22 via the network I/F 1.

In the process of the allocation control part 4, information on a redundancy degree is contained in a radio wave packet to allow also the reception side to know the redundancy degree. Since the allocation control part 4 is able to know the redundancy degree, it is possible to request re-transmission after all redundant packets are received, even if a packet is broken. It is therefore possible to minimize a wireless communication time and a re-transmission process time so that real time performance is able to be improved.

Second Embodiment

Figure 9:
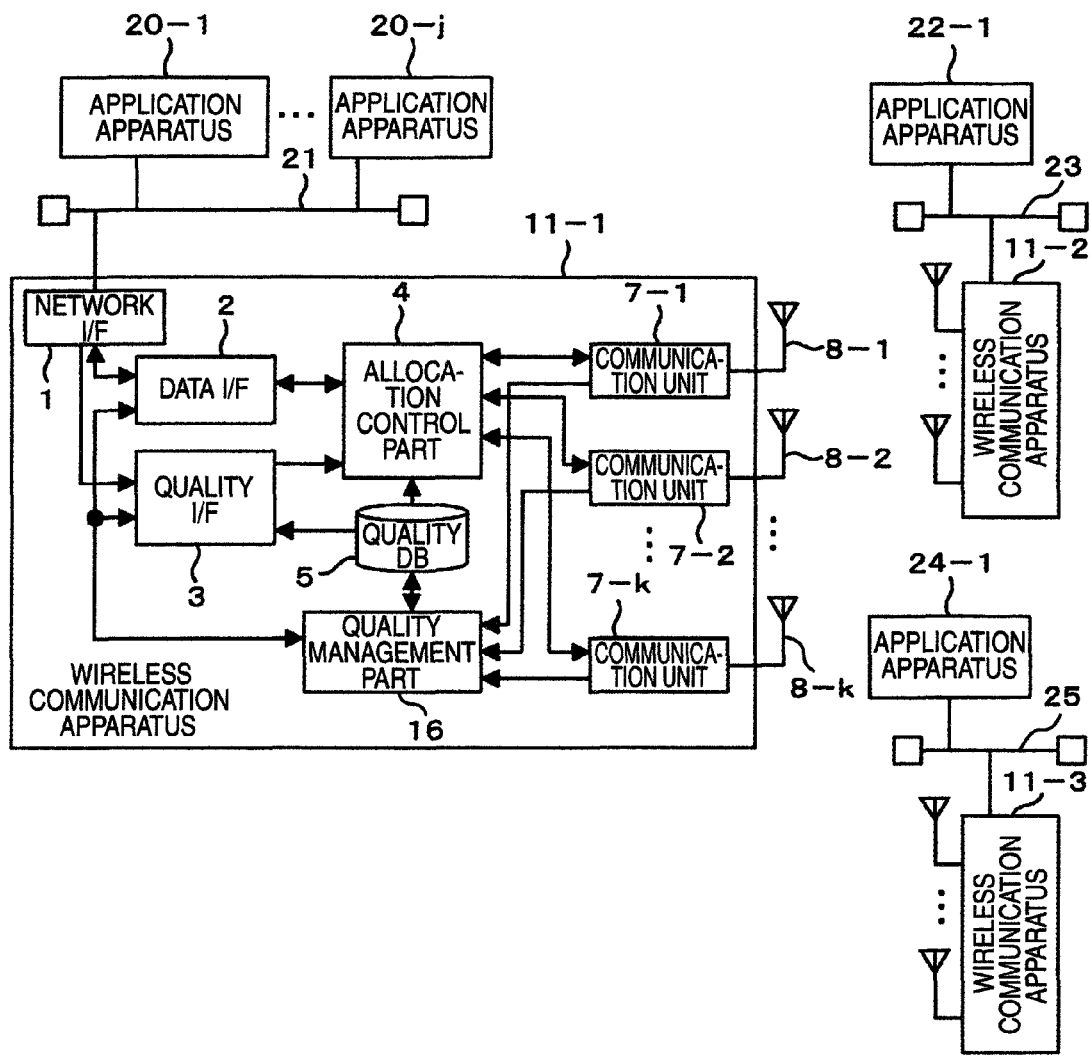
FIG. 9 illustrates the outline of a communication system adopting wireless communication apparatuses according to a second embodiment of the present invention.

FIG. 9 illustrates the outline of a communication system adopting wireless communication apparatuses of the second embodiment of the present invention.

Functions, elements and the like having identical reference symbols used in the embodiment are the same as those described in the first embodiment unless otherwise specifically notified.

The communication system of the second embodiment has a constituent element of the wireless communication apparatus different from the first embodiment. The wireless communication apparatus 11 of the embodiment has a quality management part 16 in place of the quality update part 6. The quality management part 16 asks the communication partner about diagnosis packet transmission, and by using this result, measures a bit error rate (BER).

With this embodiment, it is possible to maintain communications at high reliability by following a change in a wireless communication environment. Namely, as the wireless communication apparatus 11 actively acquires a bit error rate of wireless communications, it becomes possible to capture a change in a wireless communication environment. It is therefore possible to change communication settings to those capable of reducing the bit error rate, in accordance with a change in a wireless communication environment.

Figure 10:
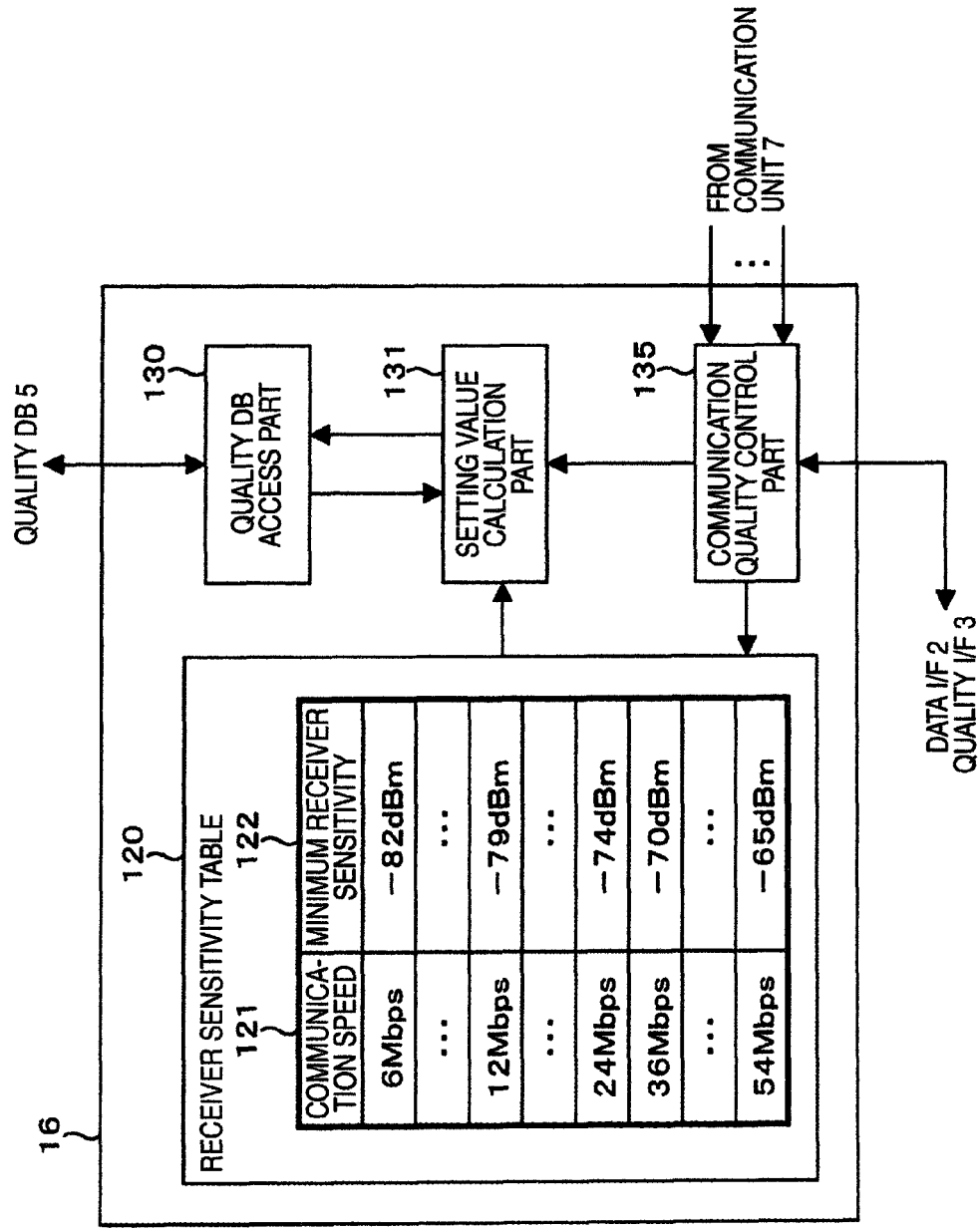
FIG. 10 illustrates the configuration of a quality managing part of the wireless communication apparatus according to the second embodiment of the present invention.

FIG. 10 illustrates the configuration of the quality management part of the wireless communication apparatus of the second embodiment of the present invention.

The quality management unit 16 of the embodiment has a communication quality control unit 135 as different from the quality update unit 6 of the first embodiment. The communication quality control part 135 has a function of issuing a diagnosis request to another wireless communication apparatus via the data I/F 2 and quality I/F 3. The communication quality control part 135 has also a function of calculating statistics of received diagnosis data and updating the minimum receiver sensitivity 122 of the receiver sensitivity table 120.

By using the sequence chart of FIG. 11, description will be made on a diagnosis request operation to be executed by the communication quality control part 135.

Figure 11:
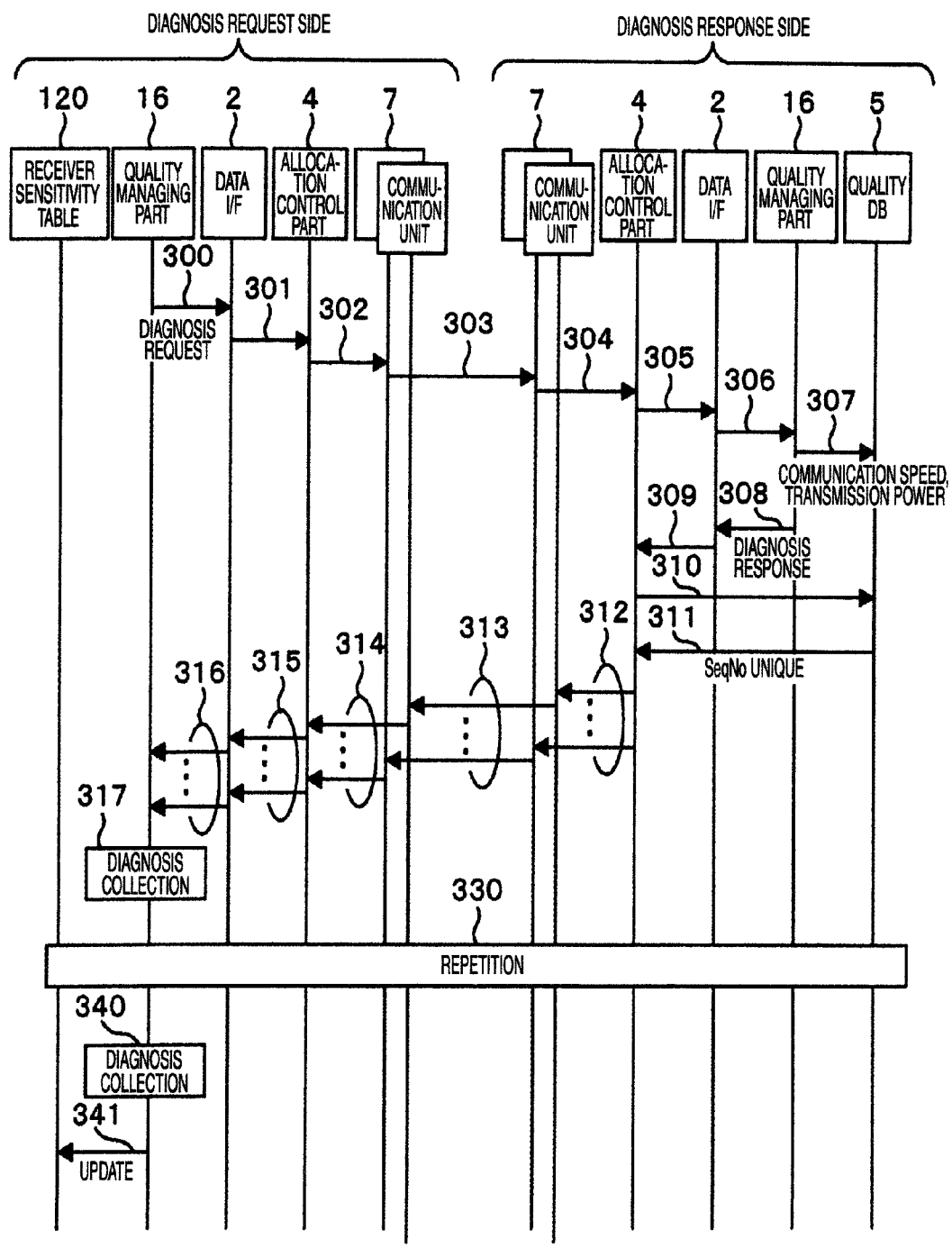
FIG. 11 is a sequence diagram illustrating a diagnosis request operation by a communication quality control part according to the second embodiment of the present invention.

In FIG. 11, the left half illustrates the operation at the wireless communication terminal 11-1 for issuing a diagnosis request, and the right half illustrates the operation at the wireless communication terminal 11-2 for performing a diagnosis response.

In the wireless communication terminal 11-1 on the diagnosis request side, the quality managing part 16 generates a diagnosis request packet and notifies it to the data I/F 2 in order to grasp a wireless communication environment (Process 300). The diagnosis request packet contains an instruction for a communication speed and a transmission power on the diagnosis response side. The data I/F 2 notifies the diagnosis request packet to the allocation control part 4 (Process 301). The allocation control part 4 instructs the communication unit 7 to transmit the packet in accordance with the requested quality (Process 302). Although the present invention is effective for both presence and absence of parallel redundancy, this embodiment uses an example of transmission without parallel redundancy. The communication unit 7 transmits the packet to the wireless communication terminal 11-2 on the diagnosis response side (Process 303).

Similar to the standard packet, in the wireless communication terminal 11-2 on the diagnosis response side, the communication unit 7 notifies a packet reception to the allocation control part 4 (Process 304). The allocation control part 4 notifies the packet directed to its own node to the data I/F 2 (Process 305). Since the packet is directed to its own node, the data I/F 2 notifies the diagnosis request packet to the quality managing part 16 (Process 306). The quality managing part 16 changes the attributes regarding the communication speed 84 and transmission power 85, with respect to the tuples having the alias "DIAG" in the quality DB 5 (Process 307). Next, the quality managing part 16 generates a diagnosis response packet and notifies it to the data I/F 2 (Process 308). In parallel to this process, the quality I/F 3 is requested to transmit the requested quality of the data by using "DIAG.". The data I/F 2 notifies the diagnosis response packet to the allocation control part 4 (Process 309). Since the requested quality of the packet is "DIAG", the allocation control unit 4 inquiries the quality DB about the entry (Process 310). As the redundancy method 87, an instruction of "sequence number (SeqNo) unique" is therefore obtained (Process 311). This instruction means that the diagnosis response packet is not made duplicate, but each packet is given a unique sequence number. The allocation control part 4 generates each communication packet having a unique sequence number, and notifies it to the communication unit 7 designated by the communication unit number 83 in the quality DB 5 (Process 312). The communication unit 7 transmits each packet to the wireless communication terminal 11-1 on the diagnosis request side (Process 313).

In the wireless communication terminal 11-1 on the diagnosis request side, the communication unit 7 notifies a packet reception to the allocation control part 4 (Process 314). The allocation control part 4 notifies the data I/F 2 of the packets each not made redundant and having a unique sequence number without unifying the packets (Process 315). The data I/F 2 notifies a packet reception to the quality managing part 16 because the packets are directed to its own node (Process 316). The quality managing part 16 collects the received packets (Process 317). Thereafter, the quality managing part 16 repeats the Processes 300 to 317 as many times as necessary for obtaining statistics (Process 330). The quality managing part 16 collects lastly diagnosis results (Process 340), calculates the minimum receiver sensitivity at the communication speed, and updates the contents of the receiver sensitivity table 120 (Process 341).

If the quality managing part 16 judges that a receiver sensitivity is unable to be calculated because of considerable loss of packets, the path of the communication unit number may be written as "invalid" in the quality DB 5. Since this path is not used at the next diagnosis request, a wireless power is not output unnecessarily, and it becomes possible to perform stable wireless communications using nearby frequencies.

As described so far, it becomes possible to acquire a minimum receiver sensitivity matching a current state by following a change in a wireless communication environment.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A wireless communication apparatus comprising:
 a plurality of communication units;
 a quality database, configured to store a correspondence relationship between:
  a listing of a plurality of communication qualities which are available via the plurality of communication units, and
  a listing of communication setups which are available for use to achieve each of the communication qualities;
 a quality interface, configured to communicate the listing of communication qualities, to an application apparatus;
 an interface, configured to receive from an application apparatus at least the following types of requests:
  (a) a request for the listing of communication qualities, and
  (b) a data request including a request for data and an indication of a communication quality for communicating the data back to the application apparatus, wherein the communication quality is one of the communication qualities listed in the listing of communication qualities;
 a data acquiring unit, configured to acquire the data requested in the data request, or in the case of a request for the listing of communication qualities, the listing of communication qualities; and
 a communication quality determining unit, configured to determine based on the quality database, in response to a data request from an application apparatus, a corresponding one of the communication setups configured to achieve the communication quality indicated by the data request;
 wherein in response to a data request, at least one of the communicating units is configured to perform wireless communication, via the determined communication setup, to communicate the data at the communication quality indicated by the data request; and
 wherein in response to request for the listing of communication qualities, the interface is configured to communicate the listing of communication qualities to the application apparatus.

2. The wireless communication apparatus according to claim 1, wherein the communication quality determining unit is configured to determine the communication setup using the indication of a communication quality from the data request.

3. The wireless communication apparatus according to claim 2, wherein the communication quality determining unit is configured to select more than one of the plurality of communication units, in accordance with the determined communication quality.

4. The wireless communication apparatus according to claim 3, wherein a transmission power is set for the communication units, depending upon a transmission power setting in the communication setup.

5. The wireless communication apparatus according to claim 4, wherein the quality database is searched for a transmission power instruction corresponding to the communication quality, and the transmission power for the communication units is set in accordance with a search result.

6. The wireless communication apparatus according to claim 3, wherein a communication speed is set for the communication units in accordance with the communication quality, depending upon a communication speed setting in the communication setup.

7. The wireless communication apparatus according to claim 6, wherein the quality database is searched for a communication speed instruction corresponding to the communication quality, and, the communication speed is set for the communication units, in accordance with a search result.

8. The wireless communication apparatus according to claim 1, wherein the at least one of the communication units is configured to make a portion of the data redundant, and the redundant data is transmitted to the application apparatus.

9. The wireless communication apparatus according to claim 8, wherein the quality database is searched for a redundancy method instruction corresponding to the communication quality, and, and in accordance with a search result from the quality database: the portion of the data is made redundant, and the redundant data is transmitted to the plurality of communication units.

10. The wireless communication apparatus according to claim 8, wherein the at least one of the communication units is configured to restrict a packet size to a predetermined size when the redundant data is transmitted to the application apparatus, wherein the predetermined size is restricted to a predetermined size limitation indicated in the communication setup.

11. The wireless communication apparatus according to claim 1, further comprising:
a propagation loss calculating unit, configured to calculate a propagation loss based on information on a transmission power and a reception power from the at least one of the communication units, and to update the quality database with the propagation loss.

12. The wireless communication apparatus according to claim 11, further comprising:
a transmission output calculating unit; and
a receiver sensitivity table;
wherein a transmission output instruction of the quality database is updated based on the propagation loss and the receiver sensitivity table.

13. The wireless communication apparatus according to claim 1, wherein the at least one of the communication units has a USB card or a PC card, and is coupled to an internal bus of the wireless communication apparatus, via a bridge.

14. The wireless communication apparatus according to claim 13, further comprising:
a wireless quality managing unit, configured to notify a diagnosis request to another wireless communication apparatus, to receive a diagnosis response corresponding to the diagnosis request, and to update the receiver sensitivity table.

15. The wireless communication apparatus according to claim 1,
wherein the listing of a plurality of communication qualities which are available via the plurality of communication units, includes at least one of: none, low, medium, high, and diagnosis; and
wherein each communication setup listed in the listing of communication setups available for use to achieve each of the communication qualities includes associated communication unit or units, and settings for at least one of: communication speed, transmission power, propagation loss, and redundancy method.

16. A wireless communication method effected by a wireless communication apparatus which includes a plurality of communication units, the wireless communication method comprising:
maintaining a quality database configured to store a correspondence relationship between:
a listing of a plurality of communication qualities which are available via the plurality of communication units, and
a listing of communication setups which are available for use to achieve each of the communication qualities;
communicating the listing of communication qualities, to an application apparatus;
receiving, via an interface, from an application apparatus, at least the following types of requests:
(a) a request for the listing of communication qualities, and
(b) a data request including a request for data and an indication of a communication quality for communicating the data back to the application apparatus, wherein the communication quality is one of the communication qualities listed in the listing of communication qualities;
acquiring, in the case of a data request, the data requested, or in the case of a request for the listing of communication qualities, the listing of communication qualities;
determining from the quality database, in the case of a data request, a corresponding one of the communication setups configured to achieve the communication quality indicated by the data request; and
communicating, in the case of a data request, the data at the communication quality indicated by the data request, via at least one of the communication units, that are configured to perform wireless communication as per the determined communication setup, or in the case of a request for the listing of communication qualities, the listing of communication qualities via the interface.

17. The wireless communication method according to claim 16, further comprising:
restricting a packet size to a predetermined size when the redundant data is transmitted to the application apparatus, wherein the predetermined size is restricted to a predetermined size limitation indicated in the communication setup.

18. The wireless communication method according to claim 16,
wherein the listing of a plurality of communication qualities which are available via the plurality of communication units, includes at least one of: none, low, medium, high, and diagnosis; and
wherein each communication setup listed in the listing of communication setups available for use to achieve each of the communication qualities includes associated communication unit or units, and settings for at least one of: communication speed, transmission power, propagation loss, and redundancy method.

* * * * *